United States Patent [19]

Williams et al.

[11] Patent Number: 5,475,735
[45] Date of Patent: Dec. 12, 1995

[54] METHOD OF PROVIDING WIRELESS LOCAL LOOP OPERATION WITH LOCAL MOBILITY FOR A SUBSCRIBED UNIT

[75] Inventors: James M. Williams, Lombard; John P. Lodwig, Naperville, both of Ill.

[73] Assignee: Motorola, Inc., Schaumburg, Ill.

[21] Appl. No.: 160,720

[22] Filed: Dec. 2, 1993

[51] Int. Cl.$^6$ .................................................. H04Q 7/38
[52] U.S. Cl. ............................... 379/59; 370/18; 370/54; 370/95.1; 379/57; 379/60
[58] Field of Search ....................... 370/18, 95.1; 379/56, 379/58, 59, 60, 57; 455/279.1, 33.1

[56] References Cited

U.S. PATENT DOCUMENTS

| | | | |
|---|---|---|---|
| 4,670,899 | 6/1987 | Brody et al. | 379/60 |
| 4,748,655 | 5/1988 | Thrower et al. | 379/60 |
| 4,833,702 | 5/1989 | Shitara et al. | 379/60 |
| 4,901,340 | 2/1990 | Parker et al. | 379/60 |
| 5,121,391 | 6/1992 | Pareth et al. | 370/95.1 |
| 5,260,988 | 11/1993 | Schellinger et al. | 379/59 |
| 5,280,472 | 1/1994 | Gilhouser et al. | 370/18 |
| 5,375,161 | 12/1994 | Fuller et al. | 379/57 |
| 5,386,417 | 1/1995 | Daughetry et al. | 370/54 |

FOREIGN PATENT DOCUMENTS

| | | | |
|---|---|---|---|
| 3016549 | 8/1993 | WIPO | 379/59 |
| 3019538 | 9/1993 | WIPO | 379/60 |
| 4003993 | 2/1994 | WIPO | 379/59 |

OTHER PUBLICATIONS

America-On-Line, "Local Loop Wireless On Trial" Aug. 15, 1994.

*Primary Examiner*—Curtis Kuntz
*Assistant Examiner*—William Cumming
*Attorney, Agent, or Firm*—Raymond J. Warren; Anthony G. Sitko; Raymond A. Jenski

[57] ABSTRACT

Mobility is provided for wireless local loop radiotelephone systems by providing the home access network of a subscriber unit with a home access number. Upon registration of the subscriber unit with its home access network, the home access number is transmitted to the subscriber unit for storage there. When the subscriber unit moves to a visited access network and registers there, the subscriber unit transmits the home access number to the visited access network, which uses the home access number to contact the home access network. Since all call originations and terminations by and to the subscriber unit occur via the individual subscriber line appearance at the PSTN, a minimum of special network elements are required for subscriber unit mobility when the home access number is stored at the subscriber unit.

5 Claims, 7 Drawing Sheets

METHOD OF PROVIDING WIRELESS LOCAL LOOP OPERATION WITH LOCAL MOBILITY FOR A SUBSCRIBED UNIT

FIELD OF THE INVENTION

This invention relates to radiotelephone communication systems in general and more particularly to the method and apparatus enabling local mobility for wireless local loop customers with minimum special network elements. Reference is made to copending U.S. patent application Ser. No. 08/085,374 filed in behalf of Lodwig, et al. on Jul. 2, 1993, assigned to the same assignee as the present invention, and which may contain related material.

BACKGROUND OF THE INVENTION

Personal communications service (PCS) generically describes a form of wireless telephone communication having the characteristics of low power, short range, and low cost. It is envisioned that PCS will economically compete with both cellular radiotelephone services and wireline telephone services. For a general overview of PCS type services and equipment see "Personal Wireless" by Bennett Z. Kobb, IEEE Spectrum June 1993, pages 21–25.

Several concepts of multiply-tiered services for PCS customers have been advanced. One key discriminator among the various service tiers is the degree of mobility accommodated by each of the tiers. A basic two service tier would include "local" service and "enhanced" service. Both provide complete wireless telephony for voice and low speed data, voice mail, and short message services. Local service is conventionally restricted to radio coverage provided in selected geographic subregions—public/private, indoor/outdoor—of a total PCS service area. This service is configured to provide "pedestrian" stowice to portables. Enhanced service conventionally includes the local service plus an additional "cellular-like" service to accommodate vehicle-borne portable units moving at moderate or high speeds. Enhanced service subscribers conventionally require dual mode portables. Full mobility for either service is desirable and would include inter-system handoff and local, regional, national, and international roaming among various interconnected systems using a standard intersystem protocol. Realizing such a wide area of mobility, however, necessitates the addition of expensive network elements to a conventional wireline telephone system. Such network elements are location registers, specially programmed telephone exchanges, and telephony signaling networks. It is desirable that automatic delivery of incoming calls be achieved regardless of the subscribers current location.

The fixed Public Switched Telephone Network (PSTN) in the U.S. basically consists of a large number of telephone switching offices interconnected with one another by means of interoffice trunks. Connected to the telephone network is a very large number of customers, each of whom has a telephone set that is connected to one specific telephone switching office (end office) by a particular physical set of wires or their equivalent that go from the customer's telephone set to the end office. For this fixed network a numbering plan is employed in the U.S. by which each telephone line (each "local loop") is identified by a particular number. This number has a geographical significance in the sense that it is structured to have an area code which localizes it to a particular area of the country, an office code which localizes the number further to a particular end office switching system, and a line code which localizes it finally to a specific line appearance on that end office. The entire network is arranged so that whenever a particular line indicates a customer's request for service (an ON-HOOK to OFF-HOOK transition), the end office to which the line is connected recognizes who the customer is (for billing purposes), where the customer is, and what kind of services are authorized for the customer's particular line. This procedure is called "call origination". Dialled digits that are received from the line for a call are recognized by the end office as indicating a particular outgoing route based on the area code and office code combination. The call is routed step by step in this fashion through the network until it reaches the far end where the destination end office recognizes the dialled area code, office code, and line code combination as representing a local loop connected to it. This procedure is called "call routing". The called line is then alerted (rung) and when the called party answers (OFF-HOOK) the final connection for the call can then be made. This procedure is called "call termination".

Thus, every telephone has a line or a local loop that has a number which uniquely identifies it. It is conventional logic in the telephone network that every telephone stays fixed and attached to its particular line appearance and does not move around. A local loop, conventionally, does not provide for customer mobility.

Cellular or mobile telephone service enables customers to have telephone sets (radiotelephones) that are not attached by wires to an end office. There is no office anywhere that has a line appearance that is recognized as being associated with the number of that radiotelephone. This means that most of the end user offices in the North American fixed telephone network are not able to deal with mobile telephones. The fixed end offices are not equipped for customers and telephone sets that are not attached to one specific fixed line appearance all of the time. Since conventional end offices cannot identify calling parties, route calls, do billing, or provide services and features except on the basis of fixed local loops, special switching systems, called mobile telephone switching offices (MTSO), are designed with special software and special hardware to interwork with each other via a suitable signalling network to accommodate customer mobility. The MTSOs also interface with the rest of the fixed telephone network, usually on a trunked basis, and thus constitute a mobile telephone network separate from but ancillary to the PSTN. With this equipment, customers and their radiotelephones can move around from one place to another, from one part of the country to another, from one city to another, and from one system to another.

To facilitate this mobility, standards have been devised (Air Interface Specifications) by which the radiotelephones can identify themselves to whatever mobile telephone system in which they find themselves. The system can then interwork through a suitable signalling network with other elements of the mobile telephone network to identify the customer, validate the customer's ability to get service, and record the network location of the customer at the moment.

If the called radiotelephone's current recorded network location is determined to be the originating MTSO, then that MTSO must execute a call termination procedure that includes determining whether or not the radiotelephone is in service, establishing contact with the radiotelephone and assigning it to a radio channel, alerting the radiotelephone user and, if an answer is received, making the final connection. However, if the radiotelephone's current recorded network location is not the originating MTSO, then the routing procedure must be extended to establish a connection with the current serving MTSO where the radiotelephone is located and that MTSO must execute the call termination procedure.

Thus, there is a clear network difference between a customer who is served by a fixed local loop where his telephone set is always found at the end of wire-like connections in the end office and a customer who is served by a radiotelephone which is dynamically changing locations, a consequence of which is that no local loop nor its associated advantages is present for the radiotelephone customer. Since a personal communications service (PCS) is a service which closely associates a telephone number with a customer, it would be desirable that a PCS stowice offer the advantages of both a local loop service and mobile telephone stowice without the added expense of additional network elements to obtain customer mobility.

DETAILED DESCRIPTION OF A PREFERRED EMBODIMENT

The present invention is encompassed in a radiotelephone system which uses radio as a part of the connection in the local loop so that there is a location where the customer is "located" and a fixed line appearance is found on a particular conventional end office. That end office is oblivious to whether there is radio in the customer's local loop or not; it is just another line appearance to the end office and is treated as though the customer's telephone set were an ordinary wired telephone.

Figure 1:
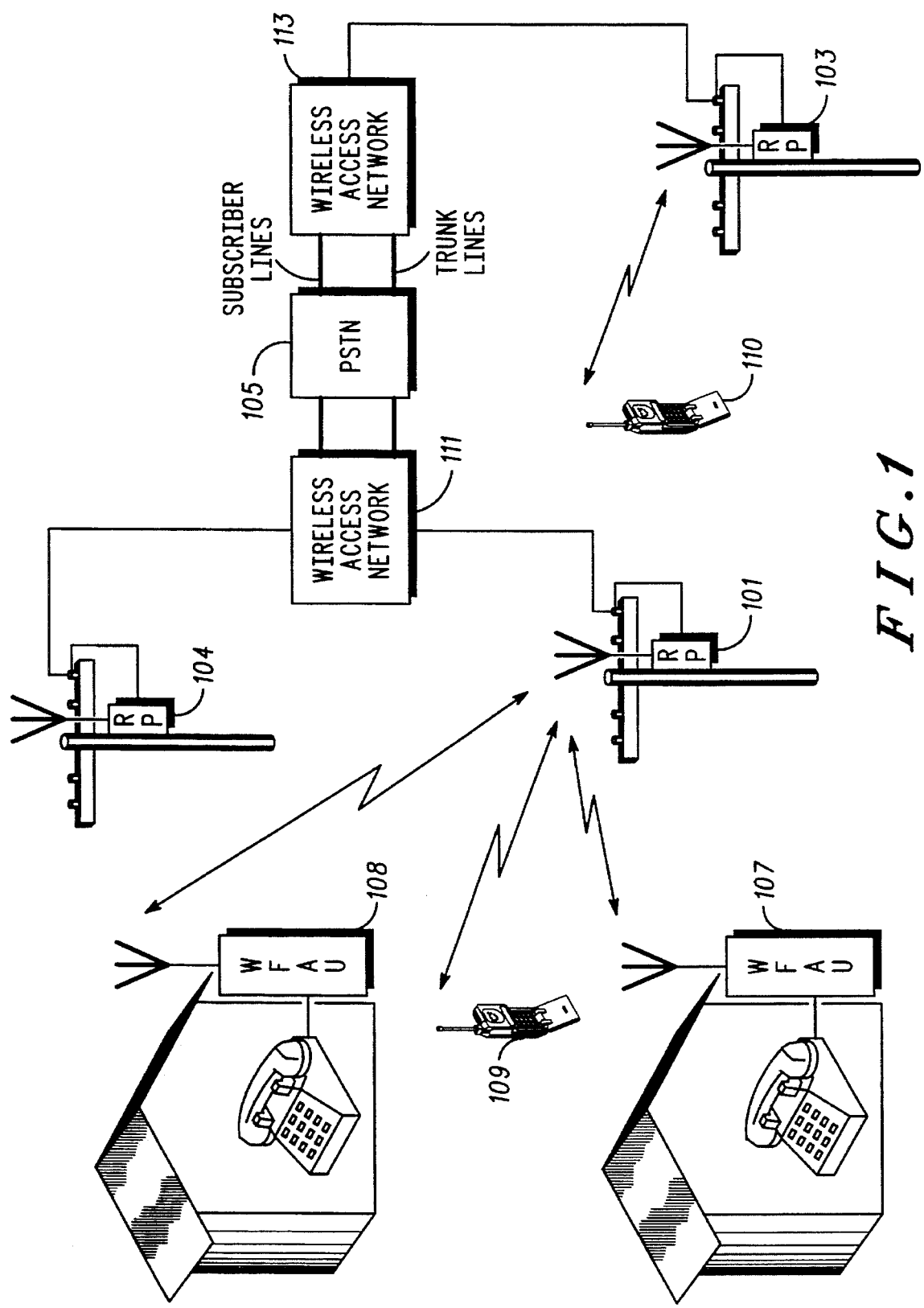
FIG. 1 is a block diagram of a wireless local loop system which may employ the present invention.

A system which could employ the present invention is shown in the simple depiction of FIG. 1. Relatively short range radio communication is realized from one or more radio transceivers (radio port-RP) 101, 103. In the preferred embodiment, an RP is a digital radio transceiver having a relatively low power transmitter. RPs 101, 103 are placed at convenient locations where access to subscriber loop facilities of the public switched telephone network (PSTN) 105 are accessible. Relatively short range radio communication (relative to for example, cellular radiotelephone communication range) is realized from the RP to a wireless fixed access units (WFAU) 107,108 or portable radiotelephones 109, 110.

A WFAU in the preferred embodiment is a customer station in which the radio portion is fixed mounted to the side of the house, for example, and the customer interface is an ordinary telephone. The term wireless fixed access for this equipment is appropriate because, although the customer station is wireless, its location is fixed. The term local loop is also appropriate because the end office side end of the radio link terminates an ordinary local loop line appearance. This form of the stowice is thus termed wireless fixed access local loop service. It is, as far as the end office is concerned, exactly the same as the service provided to wired telephones by that same office. The portable radiotelephone operates using the same air interface as the wireless fixed access unit. The portable 109 communicates with a radio port 103. All calls for a particular customer's WFAU or for a particular customer's portable radiotelephone would come in to the particular customer's local loop from the particular end office. All outgoing calls go back into the network on that same local loop using the same set of radio links and the same set of radio ports. With a portable radiotelephone, however, the customer can move about freely and the service may be termed Metropolitan Cordless Local Loop (MCLL) service.

In a system such as that depicted in FIG. 1, where there are a number of radio ports that form, collectively, a wireless access network attached to a specific end office, a portable radiotelephone subscriber may wander amongst the aggregate radio port coverage areas forming that same wireless access network. The conventional end office is not aware that the customer is moving; it treats the customer's service as though it were a standard local loop service. All calls use the customer's local loop, all billing is done with respect to the local loop, and all features are controlled in the end office by means of the local loop and the feature table associated with that particular local loop. All aspects of the portable's mobility are dealt with by the elements of the access network.

It is a feature of the present invention that the local loop customer can go beyond his own home wireless access network where his local loop resides. The customer may travel, in the preferred embodiment, into the radio coverage area of a different wireless access network in the same metropolitan area, where "metropolitan area" consists of any set of end offices equipped with wireless access networks and defined as such by the provider of wireless local loop service. This different wireless access network may, alternatively, be attached to the same end office or to a different end office but within the same metropolitan area.

When the customer is operating in the coverage area of an access network that is not his home access network, the local loop calling rules still apply. All incoming and outgoing traffic to and from that customer must still use the local loop of the customer's home wireless access network. That is, when the customer is to receive an incoming call when not in the home access network, the call is routed by the PSTN to the local loop of the customer's home access network. The home access network must have a record of where the customer is currently located and be capable of extending the call to this different access network.

When the customer initiates a call while operating in a different access network, that access network recognizes that the customer's local loop is not present there and must be capable of extending the call back to the customer's home access network where the customer's local loop resides. This is accomplished in the preferred embodiment with a set of telephone numbers. In addition to a local loop for each home subscriber, each access network utilizes a number of trunks that connect it to an ordinary end office. That group of trunks is associated with an access network telephone number so that whenever that telephone number is dialed in the PSTN, a call will be routed to the access network via that trunk group. As the wireless local loop customers move around within different coverage areas, their radiotelephone units are listening to the control channels in the access network they are in. Information on those control channels identify the access network and the system so that the customer portable radiotelephone knows whether it is in its home access network or some other access network. Whenever it finds itself in a different access network, it will according to the specifications of the Air Interface standard, access that network and perform a registration in which it identifies itself to the stowing network. As a part of that registration, the customer's portable radiotelephone provides the telephone number of its home access network. As will be described in the following text, the portable radiotelephone will have acquired the telephone number of its home access network the last time it registered there. The home access network, whenever any subscriber registers, knows whether that subscriber is a home customer of that network or not because a home customer will have an entry in the subscriber file in that access network. Every time one of its home customers registers, the home access network will download its access telephone number to the customer portable radiotelephone unit and every time the customer portable radiotelephone unit registers, at home or somewhere else, it will identify its home access network number. Thus, when the portable registers in a foreign access network coverage area, it identifies to that network the access number of its home access network. The foreign network places a call via the PSTN to that number and, when the two access networks are in communications, they will communicate by means of digital messages. The presence of a customer in the foreign access network area will be provided to its home access network along with the access number of the foreign access network. With this registration in a foreign access network, when an incoming call arrives at the home access network via the customer's local loop appearance, the home access network uses the number of the foreign network to extend the call through the PSTN to the foreign access network. The foreign access network can then perform the call termination operation and connect the call to the customer when the customer answers on a particular radio channel. Similarly, when the customer originates a call while in a foreign access network area, that access network will know that it should use the telephone number of the customer's home access network to extend the call back through the PSTN to that network to gain access to the customer's local loop. Thus, every call the customer makes or receives still uses his local loop as is required by local loop service.

The radio transceivers useful for a WFAU or a portable radiotelephone, in the preferred embodiment, are digital transceivers having a relatively low power transmitter. The frequencies of operation are typically in the range of 1.8 GHz to 2.0 GHz and are reciprocal to those employed by the serving RP. Of course, such frequency selection should not be construed as a limitation to the present invention and it should be noted that, while the preferred embodiment utilizes a digital transceiver for the over-the-air link, an analog transceiver may be employed without affecting the scope of the present invention. Likewise, various forms of digital modulation and transmission (for example, code division multiple access or time division multiple access) may be utilized without affecting the scope of the present invention. Control of the operation of the WFAU or portable radiotelephone is conventionally exercised by a microprocessor-based controller. This controller has the capability of interfacing with the customer via a keypad, display, and other interactive ports. The controller is also coupled to the radio transmitter/receiver portions to receive and transmit system overhead information as well as process telephone calls to and from the customer. Conventional internal memory elements are coupled to the microprocessor to hold the transceiver operations program, subscriber unit identification, and a home area access number useful in mobility.

Referring again to FIG. 1, the service provided in the preferred embodiment can be characterized as metropolitan cordless local loop service (MCLL). Since it is desirable to provide MCLL service at low cost, dual mode subscriber equipment and expensive infrastructure network elements for providing regional or national roaming are avoided. Nevertheless, a considerable degree of mobility is available to MCLL customers without a corresponding increase in the cost of the infrastructure. MCLL service is provided by wireless access networks employing radio technology at the subscriber end of the local loop to achieve infrastructure costs lower than those of normal wired access, metallic or fiber. These infrastructure cost savings—along with rapid deployment of basic telephone service—are the principal benefit of a MCLL service.

From the telephone network viewpoint, the wireless local loop (WLL) service is virtually identical to that of any other customer with wired service from the same telephone exchange. Each WLL subscriber (WFAU 107, WFAU 108, portable 109, and portable 110) has a permanent line appearance on the PSTN local exchange. All incoming calls to a particular subscriber are first delivered by the PSTN to the customer's primary wireless access network 111,113, and all outgoing calls are delivered from the primary wireless access network to the PSTN 105 via the customer's dedicated line appearance. All basic and supplementary telephone services and the billing for them are provided by the local exchange of the PSTN where the customer's line appearance resides.

A subscriber using a portable 109 can expect to obtain full service mobility beyond the local access network served from RP 101 and RP 104, and throughout all of the other access networks deployed within the local metropolitan service area of the customer's telephone carrier. Furthermore, operator assisted credit card calling permits outgoing calls to be made by a customer using a portable in an area where full service mobility is not available, that is, other metropolitan areas. Calls to emergency services are made without formal validation from any point where compatible radio coverage exists.

Considering the elements of the preferred embodiment in more detail, a Wireless Local Loop Service (WLL) is used for loop rehabilitation or for serving new "wireline" subscribers where economics are favorable. Wireless access for WLL may be provided by any Air Interface with appropriate cost/performance attributes. For the preferred embodiment, the access technology of the TA-NWT-001313. "Generic Criteria for Version 0.1 Wireless Access Communications Systems (WACS), Issue 1, July 1992 and Supplement 1, November, 1992, "Layers 2 and 3 Updates" is assumed. Methodologies are included for effective encrypted authentication and radio link encipherment for security and voice/data privacy, respectively.

Figure 2:
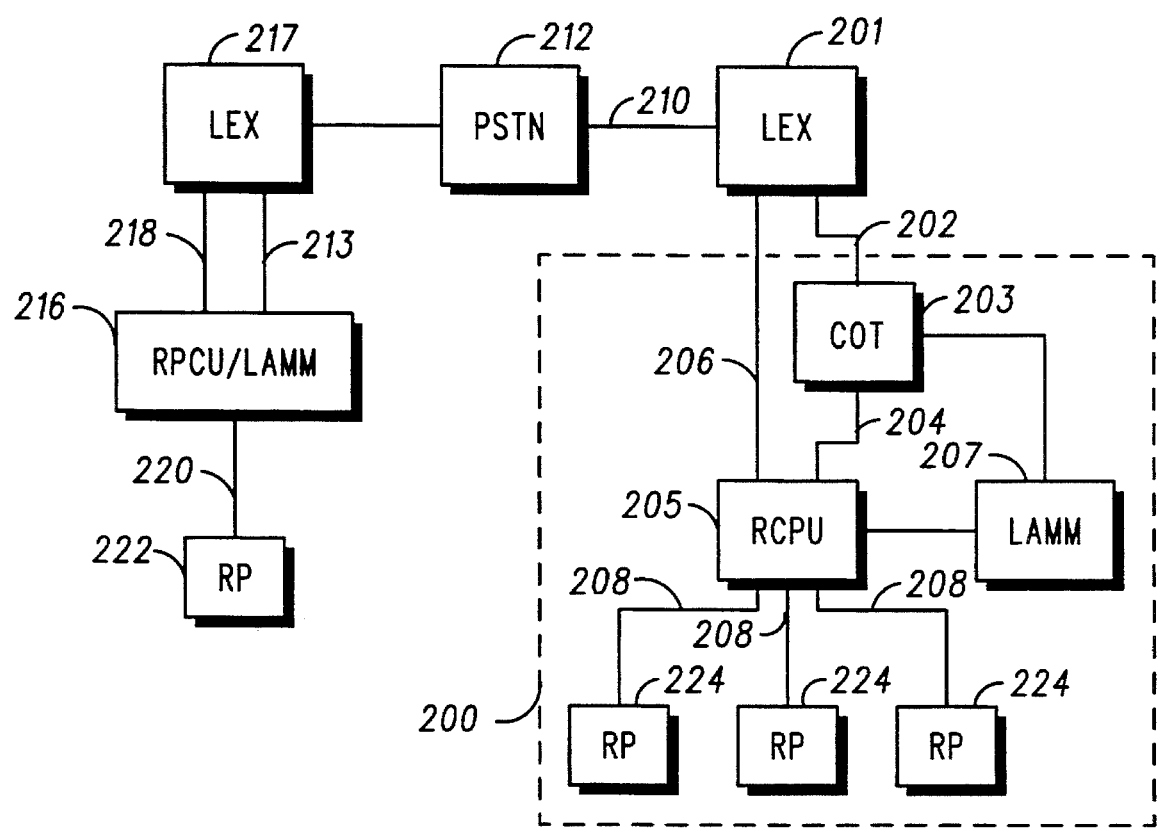
FIG. 2 is a block diagram of the fixed equipment architecture of a wireless local loop network which may employ the present invention.

Turning now to FIG. 2, the architecture for wireless local loop service may be perceived. The basic WLL service itself appears nearly identical to that of any other customer with wired service from the same local exchange. A Local Exchange (LEX) 201 interfaces to a Wireless Access Network 200 that employs radio technology at the subscriber end of the local loop to achieve infrastructure costs lower than those of normal "wired" access, metallic or fiber. These infrastructure cost savings—along with rapid deployment of basic telephone service—are benefits realized by the WLL of the present invention. It is a feature of the present invention that no special requirements are placed on the selected LEXs. Expensive telephony signaling networks, such as SS#7, or special "mobility-related" elements, such as Home Location Registers (HLRs), Visitor Location Registers (VLRs), Service Control Points (SCPs), etc., are not required to realize a system employing the present invention.

It is an important feature of the present invention that each WLL subscriber have a dedicated line appearance, physical or virtual, on the LEX. All incoming calls are first delivered by the PSTN to the WLL customer's home Wireless Access Network 200, and all outgoing calls are delivered from the customer's home Wireless Access Network 200 to the PSTN, via this line appearance. All basic telephone services, most supplementary services, etc., and the billing for them are provided by the LEX 201 where the subscriber's line appearance resides.

Mobility is not the primary consideration for the system, being subordinate to minimal cost. Nevertheless, considerable mobility is made available to MCLL customers with virtually no corresponding increase in the cost of the infrastructure. In addition, the Radio Port facilities in the Access Networks have all of the capabilities necessary to support the wide area mobility of the local and enhanced services, once the additional infrastructure elements are added, and can serve as part of the initial radio coverage deployment for such services.

Each wireless local loop customer requires one dedicated line appearance on a local switching office (local exchange). In many instances, these will be physical appearances in the form of analog lines 202. Such analog lines require the use of a Central Office Terminal (COT) 203. For LEXs with integrated digital subscriber loop capabilities 218, no COT is required and the dedicated subscriber line appearances are virtual. Digital carrier facilities (T1 or E1) 204, 218 are used to connect a Radio Port Control Unit (RPCU) 205 to the LEX 201. The format of this digital signal conforms to one of the major standards for Digital Subscriber Loop transport (for example, but without limitation, TR-TSY-000303 "Integrated Digital Loop Carrier System Generic Requirements, Objectives and Interface", Issue 1, September, 1986, plus Revision 1, December 1987; Revision 2, July, 1989; Revision 3, March, 1990; Supplement 2, October, 1989 and Supplement 3, March, 1990, Bellcore.). A group of trunks 206, 213 is referred to by a single telephone access number, which is used to establish connections between different Local Access and Mobility Manager (LAMM) serving areas for MCLL service and/or for handoffs. Preferred transmission technology is one of the common forms of multiplexed digital carrier systems (T1 or E1).

Digital Subscriber Loop transmission facilities 208 consist of one dedicated digital subscriber loop carrier system per RF carrier equipped at a Radio Port. Preferred transmission technology is a form of High-speed Digital Subscriber Loop (HDSL) compatible with one of the common multiplexed digital carrier systems (T1 or E1). Normal, interexchange trunk facilities connections 210 to the PSTN 212 consist of whatever facilities may exist in the local exchange network, however, one of the common forms of multiplexed digital carrier systems (T1 or E1) is preferred. The Central Office Terminal (COT) 203 manages the interfaces with the physical analog subscriber line appearances 202 at the Local Exchange (LEX) 201 and with the digital cartier facilities 204 to a RPCU 205. Standard signaling notifies the Local Access and Mobility Manager (LAMM) 207 of ringing signal on any subscriber line and performs all on-hook, off-hook, out-dialing and other procedures as directed by the LAMM 207. A/D CODECs (not shown) are located in the COT 203 and the capability is provided to interconnect an available time slot in the digital carrier facilities 204 to/from the RPCU 205, with any subscriber line appearance, as required. The Local Exchange (LEX) 201 is any existing PSTN switching system designed to provide normal exchange services to fixed subscribers. All primary and supplementary services are controlled and all billing information is assembled here.

The Radio Port Control Unit (RPCU) 205 provides interfaces to a number of Radio Ports via the Digital Subscriber Loop transmission facilities 208 and provides all logic necessary to support the Air Interface. This includes transcoding between the PCM of the local digital network and the voice coding scheme of the relevant Air Interface physical channel structure, and multiplexing/de-multiplexing of the Air Interface signaling protocol. The RPCU 205 contains a small Time Slot Interchanger (TSI) to interconnect any time slot in the digital carrier facilities 204 with another in the Digital Subscriber Loop transmission facilities 208 representing the radio link dynamically assigned at access time. The TSI also facilitates handoff, when appropriate, among the group of radio coverage areas connected to the RPCU 205.

Alternatively, a Local Access and Mobility Manager (LAMM) may be integrated with an RPCU 216 as shown in FIG. 2. The LAMM 216, coupled to LEX 217, and LAMM 207 terminates the signaling channel(s) of the digital carrier facilities 218,204 and the Digital Subscriber Loop transmission facilities 220,208 interfaces to the radio ports RP 222, 224 and performs all necessary protocol conversions. It provides the logic to control the alerting, access, authentication and encryption processes on the Air Interface, to correlate the Subscriber Terminal Identity with the appropriate subscriber line appearance and to manage all interconnections via the TSIs in the RPCU 205,216. It also participates in inter-RPCU handoff and in re-connect on loss of signal.

The LAMM 207 maintains a Permanent Subscriber Information Store (PSIS) in a conventional storage element, indexed by the Subscriber Terminal Id and the subscriber line Id, which contains all information required for managing the operations of those MCLL customers whose primary ("home") Wireless Access Network corresponds to the Radio Ports 224 controlled by the LAMM 207. Some of the data fields contained in the PSIS are described below. The LAMM 207 also maintains a Temporary Subscriber Information Store (TSIS), which contains all information required for managing the operations of those WLL customers who are currently resident in the radio coverage area of the RPs controlled by the LAMM and whose home Wireless Access Network corresponds to Radio Ports controlled by a different LAMM. Some of the data fields contained in the TSIS are described below.

A Radio Port (RP) contains one or more digital transceivers and all necessary software for operating in either a local or an enhanced access mode. It interfaces to the RPCU 205 via Digital Subscriber Loop transmission technology modified to accommodate Air Interface requirements.

The Wireless Fixed Access Unit (WFAU) is a personal communications system (PCS) customer radiotelephone packaged for permanent mounting in or on customer premises at a fixed location. It interworks with the RP infrastructure and is equipped with an interface supporting connection of a standard wireline telephone set. All supervisory and address signaling is provided and appropriate electrical levels are maintained at this interface.

Operations, Administrative and Maintenance (OAM) functions provide the means for managing the deployment and configuration of the wireless access portions of the infrastructure, the customer information required to provision the stowice and all relevant alarms and routine maintenance. (The OAM element does not appear in FIG. 2).

The subscriber unit (portable radiotelephone or WFAU) uses identification and security data and other relevant information to connect and maintain telephone calls. The following items of information are maintained in the internal memory of each subscriber terminal: SU ID—subscriber unit (terminal) identity (Programmed into the terminal off-line); AUTH ID—authentication identity used in verifying the subscriber unit's identity (Programmed into the terminal off-line); CIPHER KEY—private session key to be provided by the subscriber unit with each service request access and used to encipher all RF transmissions beyond the initial access message (Programmed into the subscriber unit off-line); HOME AREA ACCESS NUMBER—a phone number to be provided by the subscriber unit to the serving LAMM at initial registration and used to establish a connection to the subscriber unit's home Wireless Access Network for reporting the subscriber unit's initial registration or for accessing the customer's line appearance for an outgoing call (Supplied to the subscriber unit by the LAMM at each registration with the home Wireless Access Network); ANCHOR NETWORK ACCESS NUMBER—A phone number to be provided by the subscriber unit to the target LAMM when requesting a handoff (Alternate Link Transfer-ALT). (Supplied by the serving LAMM at call set-up time and may be either the access number of the serving LAMM or that of the subscriber unit's home Wireless Access Network); SERVICE PROVIDER ID—identity of the Service Provider in whose service area the subscriber unit is currently registered (Supplied by the LAMM as System Information); ALERT AREA—identity of a group of Radio Ports that represent the alerting (or registration) area in which the subscriber unit last registered (Supplied by the LAMM as System Information); ALERT PHASE—portion of the alerting super-frame during which the subscriber unit's alerts will be transmitted (Assigned by the LAMM at registration. This field is always null when the subscriber unit is not in-service); ALERT ID—temporary identity, assigned by the LAMM at registration, and used by the system to initiate contact with the subscriber unit (This field is always null when the terminal is not in-service); and CALL ID—Radio Call Identifier assigned by the serving LAMM for each call-related access by a subscriber unit (Null except during a call-related access).

Each WLL customer must have an entry in the Permanent Subscriber Information Store (PSIS) of the particular LAMM in the PCS service provider's service area associated with the customer's dedicated line appearance. PSIS entries are created by administrative action and, at a minimum, include the following items of information: LINE ID—the internal identity of the customer's dedicated line appearance on the local exchange; SU ID—the subscriber unit (terminal) identity; AUTH ID—the authentication identity used in verifying the subscriber unit's identity; ALERT AREA —the identity of a group of Radio Ports that are defined as constituting an alerting (or registration) area. If this field identifies an area controlled by the LAMM, the subscriber unit is currently resident in its primary Wireless Access Network, otherwise, the subscriber unit is operating in another area controlled by a different LAMM; ALERT PHASE—the portion of the alerting super-frame during which a subscriber unit's alerts are transmitted (Assigned by the LAMM at registration, de-assigned at power down or notification of registration in a different radio coverage area. This field is always null when the subscriber unit is not in-service in its home Wireless Access Network area); ALERT ID—a temporary identity, assigned by the LAMM at registration, used by the system to initiate contact with a subscriber unit, and de-assigned at power down or notification of registration in a different radio coverage area (This field is always null when the terminal is not in-service in its home Wireless Access Network area); CALL ID—the Radio Call Identifier assigned by the serving LAMM for each call-related access by a subscriber unit (Null except during a call-related access); CIPHER KEY—the private session key, provided by the subscriber unit with each service request access, and used to encipher all RF transmissions beyond the initial access message (Null except during an access); REMOTE AREA ACCESS NUMBER—a phone number used to establish a connection for delivery of an incoming call to a subscriber unit currently operating in a different radio coverage area (Provided by the LAMM controlling the other area when sending notification of the subscriber unit's initial registration there. Null if the terminal is currently registered in the "home" area); EXTENDED TERM—a count of the number of incoming calls terminated in a Wireless Access area other than the "home" area; and EXTENDED ORIG—a count of the number of outgoing calls originated from a Wireless Access area other than the "home" area.

For each WLL subscriber unit (portable radiotelephone or WFAU) currently registered in its service area but not listed in the PSIS, the LAMM must maintain an entry in its TSIS. These entries are created automatically by the LAMM at the time of the subscriber unit's initial registration in the alert area and are erased at de-registration. At a minimum, the following items of information are included in each entry: SU ID—the subscriber unit (terminal) identity (Supplied by the subscriber unit at registration); AUTH ID—the authentication identity used in verifying the subscriber unit's identity (Supplied by the subscriber unit at registration); HOME AREA ACCESS NUMBER—a phone number used to establish a connection to the access network in a subscriber unit's home radio coverage area for reporting the subscriber unit's initial registration or for accessing the customer's line appearance for an outgoing call (Supplied by the subscriber unit at registration); ALERT AREA—the identity of a group of Radio Ports that are defined as an alerting (or registration) area and which include the RP at which the subscriber unit's last registration was received (Assigned by the LAMM at registration and always identifies an area controlled by the LAMM); ALERT PHASE—the portion of the alerting superframe during which a subscriber unit's alerts will be transmitted (Assigned by the LAMM at registration, de-assigned at power down); ALERT ID—a temporary identity, assigned by the LAMM at registration, used by the system to initiate contact with a subscriber unit, and de-assigned at power down; CALL ID—the Radio Call Identifier assigned by the serving LAMM for each call-related access by a subscriber unit (Null except during a call-related access); and CIPHER KEY—the private session key provided by the subscriber unit with the RCID request transaction during access and used to encipher all RF transmissions beyond that point (Null except during an access).

In the system environment for WLL operations, the Air Interface specification details procedures whereby a portable radiotelephone or WFAU may: determine whether or not a usable radio signal is available at the subscriber unit's current location; select a suitable Radio Port to serve as its current network access point; and decide whether or not a Registration transaction with the network is necessary subsequent to Radio Port selection. These procedures are performed whenever the subscriber unit is powered up and periodically for as long as the subscriber unit remains turned on.

To facilitate these procedures, each Radio Port continuously transmits a system Broadcast Channel (SBC) using a particular time slot on one of its assigned carrier frequencies. Two logical channels—the System Information Channel (SIC) and the Alerting Channel (AC)—are generated by the LAMM and multiplexed onto the SBC by the RP. Remaining time slots are used for subscriber traffic. The SIC includes any information required by subscriber units to perform the above procedures.

Another procedure is specified whereby a subscriber unit, at power down, will inform the network that it is about to go out-of-service. Collectively, these procedures address the mobility-related issues of system acquisition, registration, de-registration, sign-in and sign-out. In addition, each Radio Port maintains one or more traffic channels that are "marked" with a known bit pattern as "Idle and Available". All wireless accesses follow the same general procedure in which the first byte of the initial access message, indicating the nature of the access, is transmitted in the clear. The remainder of the message includes the Terminal Id, the Authentication Id, and the subscriber unit's private Cipher Key to be used as the session key for the remainder of the access. This information is encrypted using the Public Key supplied by the network in the SIC.

The current Local Service Air Interface document (TA-NWT-001313. "Generic Criteria for Version 0.1 Wireless Access Communications Systems (WACS), Issue 1, July 1992 and Supplement 1, November, 1992, "Layers 2 and 3 Updates" , Bellcore) specifies both "Registration" and "De-registration" transactions, states when each is to be used and describes the network activities resulting from each. According to the Air Interface, the de-registration transaction is only performed at power-down, but results in a complete cancellation of the terminals registration in the network, which then necessitates a complete re-establishment at power-up, even though the subscriber unit may not have moved to a new location. This treatment often results in unnecessary traffic in the signaling network and is clumsy in the low-cost network architectures for Wireless Local Loop applications.

Registration is the process by which the WLL network lists a portable radiotelephone or WFAU as being present at a particular location within the network. It involves an Air Interface transaction between the subscriber unit and the serving Wireless Access Network at which time the subscriber unit's identity is authenticated and an alerting identity is assigned. The serving LAMM must make an entry in its data structure to store the subscriber unit identity, the authentication identity and the alerting identity. The serving LAMM must also conduct a transaction with the LAMM in the subscriber unit's primary Access Network to verify the subscriber unit's identity, update location for call delivery purposes and establish Service Qualification in anticipation of service requests. Strictly speaking, registration only occurs when the subscriber unit selects a Radio Port that is transmitting a System Id or an Alerting Area Id that is different from that of the subscriber unit's last registration.

De-registration is the process by which the WLL network's listing of a subscriber unit's presence at a particular location within the network is canceled. The subscriber unit's entry in the visited LAMM's data structure is erased and the home LAMM's notation of current location is cleared or over-written. De-registration may occur as the result of a new registration by the subscriber unit in a different Access Network or as the result of a visited LAMM's internal auditing process establishing, for example, an extended period of inactivity. In this case, it should not be necessary to notify the subscriber unit's home LAMM of the visited LAMM's decision unless a service request or other message is received from the home LAMM.

Sign-in/sign-out is the process by which the WLL network keeps track of the current operating status—in-service or out-of-service—of a subscriber unit. This process also involves Air Interface transactions between the subscriber unit and the serving Wireless Access Network. Registration clearly implies sign-in—the subscriber unit must be in-service to conduct the transaction.

Sign-in is a re-registration which requires the assignment of a new alerting identity but does not require a transaction with the home LAMM. Sign-in, strictly speaking, only occurs when the subscriber unit powers up and selects a serving Radio Port at which the System Broadcast Channel carries the same System Id and the same Alert Area Id for which the subscriber unit last registered.

Sign-out, strictly speaking, only occurs when the subscriber unit powers down and does not imply de-registration, as defined above. The visited LAMM will release the subscriber unit's current alerting identity but should not erase its entry in the data structure. It is also not necessary to notify the home LAMM of the change in operating status, but, if the home LAMM is notified, the IS-41 CSSINACT message should be used rather than REGCANC.

The same Air Interface "message" is used for all of the above operations with a parameter indicating the particular usage, e.g., 0 Sign-out.

1 Initial registration (new alerting area).

2 Sign-in (Same alerting area as at sign-out).

This allows the visited LAMM to accurately recognize when the home LAMM requires notification of registration and when it does not.

Figure 3:
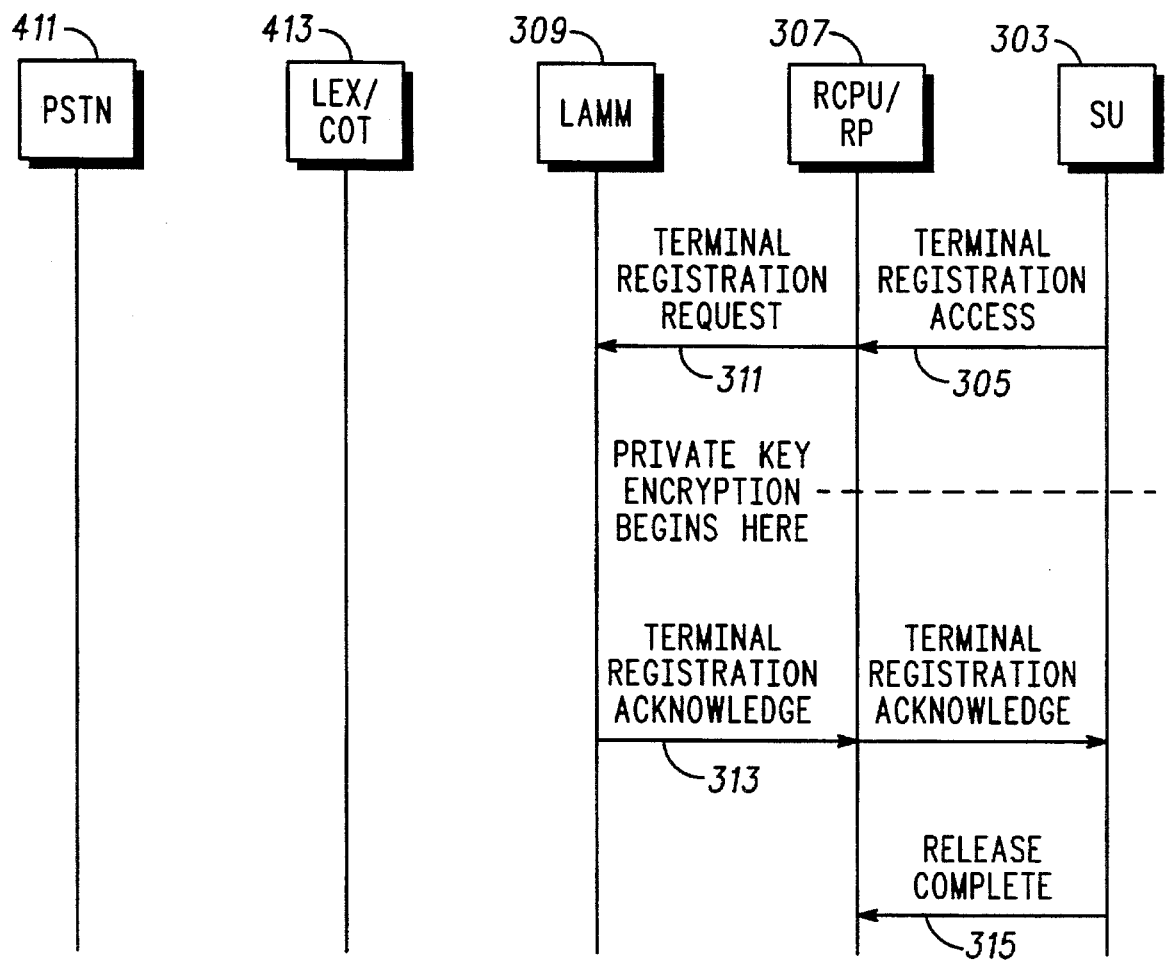
FIG. 3 is a timing diagram of subscriber registration in the home access network which may be employed in the present invention.

FIG. 3 illustrates the registration process in the home Access Network. The participating network hardware includes a subscriber unit (303), which is most probably a portable radiotelephone such as portable radiotelephone 109 but can also be a WFAU, a Radio Port (RP) and a Radio Port Controller (RPCU) 307, and a Local Access and Mobility Manager (LAMM) 309.

The subscriber unit (SU) 303 uses a digital correlation process to acquire frame sync with a "marked idle" time slot on a radio channel transmitted from a serving Radio Port (RP) 307. The subscriber unit (SU) 303 then transmits a Terminal Registration Access (TERM REG ACC) message 305 to the RPCU RP 307 on a selected radio traffic channel. This message contains the REGISTRATION TYPE parameter (set to 1) and the HOME AREA ACCESS NUMBER (null if the subscriber unit has never before registered in its home area). The RPCU/RP 307 relays the subscriber unit's request to the LAMM 309 via a TERM REG REQ message 311.

The LAMM 309 recognizes the SU 303 as a customer of the local Access Network because the LAMM has an entry in its PSIS. It authenticates the subscriber unit's identity, assigns an Alert Phase and an Alert Id, updates the alerting information and clears the Remote Access Number in the PSIS entry and sends a Terminal Registration Acknowledge (TERM_REG_ACK) message 313 to the subscriber unit. It is a feature of the present invention that this message contains the alerting information and the LAMM's local network access number (whether or not the subscriber unit sent in the right number with its Registration Request).

The subscriber unit updates its relevant internal memory and sends a Release Complete (REL_COM) message 315 to the RPCU/RP 307, releasing the radio link.

This procedure is identical for a sign-in registration except that in the first step, the REGISTRATION TYPE parameter is set to 2 instead of 1. For a sign-out registration, the REGISTRATION TYPE parameter in the first step is set to 0 instead of 1 and the LAMM 309 clears the Alert Phase and Alert Id fields, indicating an out-of-service condition.

Figure 4:
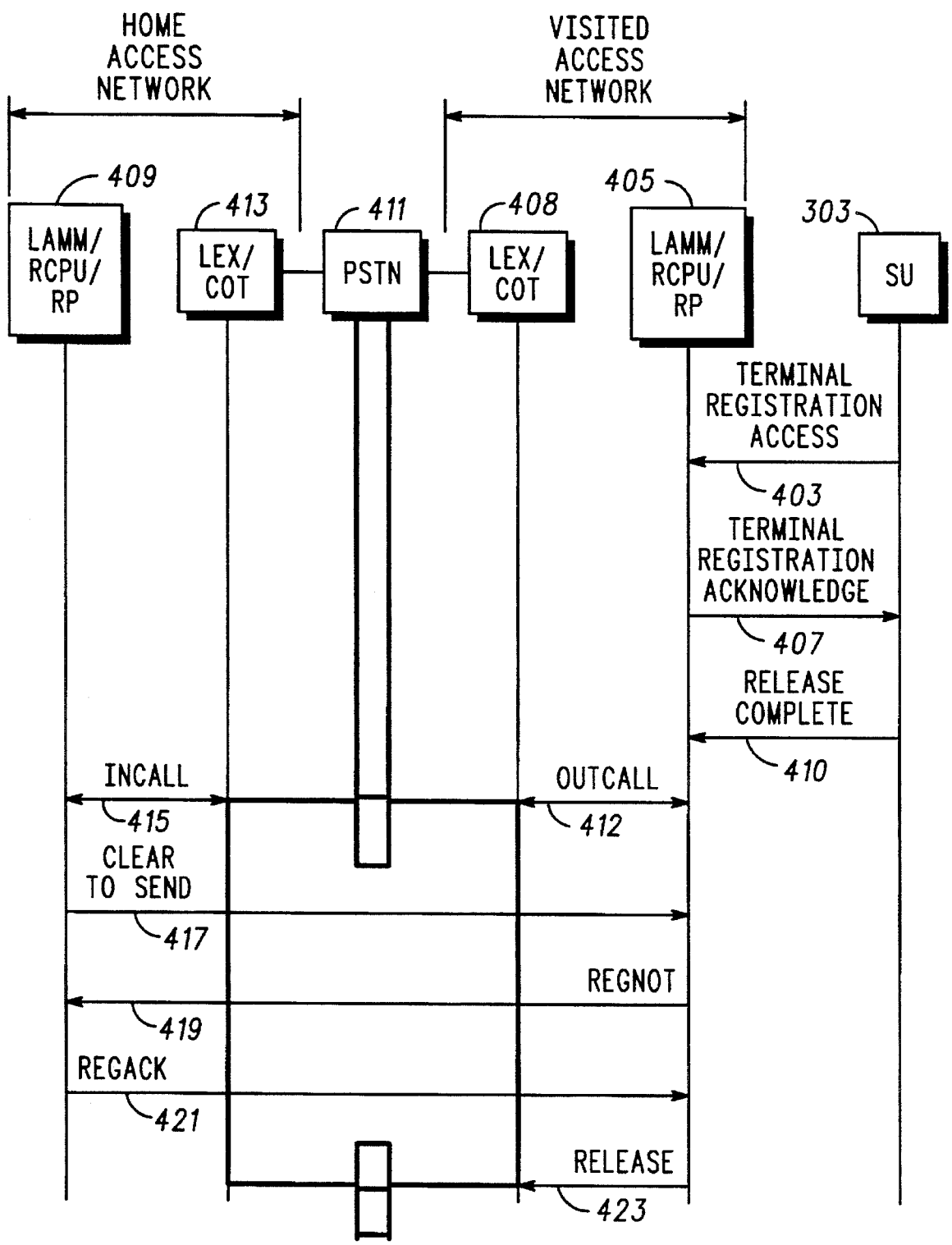
FIG. 4 is a timing diagram of subscriber registration in the visited access network which may be employed in the present invention.

FIG. 4 illustrates the process of registration in a foreign or "visited" Access Network. The subscriber unit 303 uses a digital correlation process to acquire frame sync with a "marked idle" time slot and then transmits a Terminal Registration Access (TERM REG ACC) message 403 (including the telephone access number of the SU 303 home network which was originally supplied to the SU 303 upon its registration in its home Access Network) to the LAMM/RPCU/RP 405 on the selected traffic channel. (As a simplification aid to understanding, the functions of the Radio Port (RP), the Radio Port Control Unit (RPCU), and the Local Access and Mobility Manager (LAMM) are considered as one function for this registration process.) This process is the same as that illustrated in FIG. 3 except that the LAMM does not find an entry for the subscriber unit 303 in its PSIS and, therefore, creates an entry in the TSIS. It assigns an ALERT PHASE and an ALERT ID and stores the subscriber unit's HOME AREA ACCESS NUMBER. Also, since the LAMM does not manage the subscriber unit's home Access Network, it does not provide the subscriber unit 303 with its local access number in the TERM REG ACK message 407. The SU 303 transmits a Release Complete (REL COM) message 410 to me LAMM/RPCU/RP 405, reacquires the System Broadcast Channel and begins monitoring the Alerting Channel multiplexed thereon.

The LAMM/RPCU/RP 405 in the visited Access Network instructs its RPCU to perform an OUTCALL transaction 412 with the local visited LEX/COT 408 via an access trunk (using the HOME AREA ACCESS NUMBER supplied by the subscriber unit 303 with the TERM REG ACC message 403) and to establish a connection for a data transaction with the LAMM/RPCU/RP 409 in the home Access Network. The PSTN 411 establishes a connection with the LEX/COT 413 in the home Access Network. In response the LEX/COT 413 initiates an INCALL procedure 415 in which the LAMM/RPCU/RP 409 is informed of the incoming call and a connection is established for a data transaction with the LAMM/RPCU/RP 405.

With the data link established, the LAMM/RPCU/RP 409 transmits a CLEAR_TO_SEND message 417 to the LAMM/RPCU/RP 405. The LAMM/RPCU/RP 405 transmits a Registration Notification message (REGNOT) 419 to the LAMM/RPCU/RP 409 containing the Subscriber Unit Id, the Authentication Id and the Access Number of the visited Access Network. The LAMM/RPCU/RP 409 finds the subscriber unit's entry in the PSIS, authenticates the identity, clears the alerting information and records the REMOTE AREA ACCESS NUMBER. It then sends a Registration Acknowledgment (REGACK) message 421 to the LAMM/RPCU/RP 405 indicating that the subscriber unit is authorized for access. The LAMM/RPCU/RP 405 sends a RELEASE message 423 to the LEX/COT 408 which indicates CLEAR FORWARD to the PSTN and the PSTN clears the call path.

The procedure described above is identical for a sign-in registration except that in the first step, the REGISTRATION TYPE parameter is set to 2 instead of 1 and in the second step the LAMM/RPCU/RP 409 finds the subscriber unit's entry in the TSIS, assigns a new ALERT PHASE and ALERT ID and transmits the TERM REG ACK message 407. The remaining steps after the REL COM message 410 are not executed. For a sign-out registration, the REGISTRATION TYPE parameter in the first step is set to 0 instead of 1 and in the second step the LAMM/RPCU/RP 409 finds the subscriber unit's entry in the TSIS and clears the Alert Phase and Alert Id fields, indicating an out-of-service condition. The sign-out is acknowledged and the remaining steps are not executed.

In all initial registration scenarios, if the subscriber unit does not have an entry in the PSIS and the Home Area Access Number field in the TERM_REG_REQ message is not recognized by the LAMM as belonging to the metropolitan service area of the local exchange carrier, the LAMM will still send a TERM_REG_ACK message to the subscriber unit but with a "dummy" Alert Phase and Alert Id and without the local access number. The LAMM will make no record of the registration, however. This subscriber unit will be unable to receive any incoming calls and any call origination attempts will be routed to an operator for credit card treatment.

Figure 5:
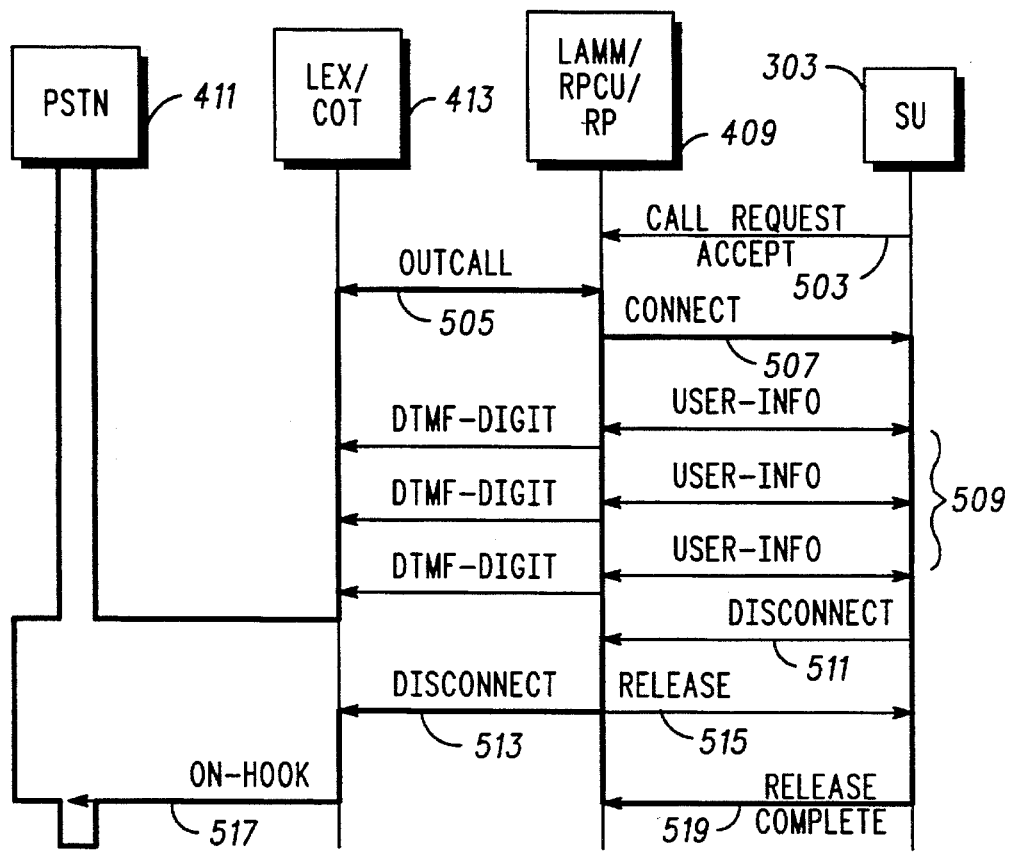
FIG. 5 is a timing diagram of subscriber call origination in the home access network which may be employed in the present invention.

FIG. 5 shows the procedure for call origination by a subscriber unit in its home Access Network and assumes post-access dialing. In this process the customer lifts the telephone handset (or indicates "OFF-HOOK") and the SU 303 uses a digital correlation process to acquire frame sync with a "marked idle" time slot and then transmits a Call Request Access (CALL REQ ACC) message 503 to the LAMM/RPCU/RP 409 on the selected traffic channel. The called party number field contains no dialed digits. The LAMM/RPCU/RP 409 initiates an OUTCALL procedure 505 in which "OFF-HOOK" is indicated to the LEX/COT 413 for the customer's dedicated line appearance. The LEX/COT 413 provides dial tone. The LAMM/RPCU/RP 409 directs its RPCU to establish a connection between the LEX/COT 413 interface channel and the radio traffic channel and sends a CONNECT message 507 to the SU 303 which begins voice decoding so that the customer may hear dial tone and/or other progress tones from the network. This message may also contain a number to be used by the subscriber unit in requesting Automatic Link Transfer to another access network.

The customer proceeds with dialling. The SU 303 detects and sends each successive digit to the LAMM/RPCU/RP 409 by means of USER INFO—DIGIT messages 509. The LAMM/RPCUfRP 409 directs its RPCU to outpulse each received digit to the LEX/COT 413. When the LEX/COT 413 determines end-of-dialling, it routes the call to its destination through the PSTN 441. The origination phase is then complete from the Access Network's point of view. The PSTN completes its processing and, if the called party answers, conversation ensues.

When the customer ends the call, the subscriber unit 303 sends a DISCONNECT message 511 to the LAMM/RPCU/RP 409. The LAMM/RPCU/RP 409 sends a release message 515 to the SU 303 and a DISCONNECT message 513 to the LEX/COT 413. The LEX/COT 413 indicates ON-HOOK 517 to the PSTN 411 and the SU 303 sends a REL_COM message 519 to the LAMM/RPCU/RP 409 which returns the radio channel to idle.

Figure 6:
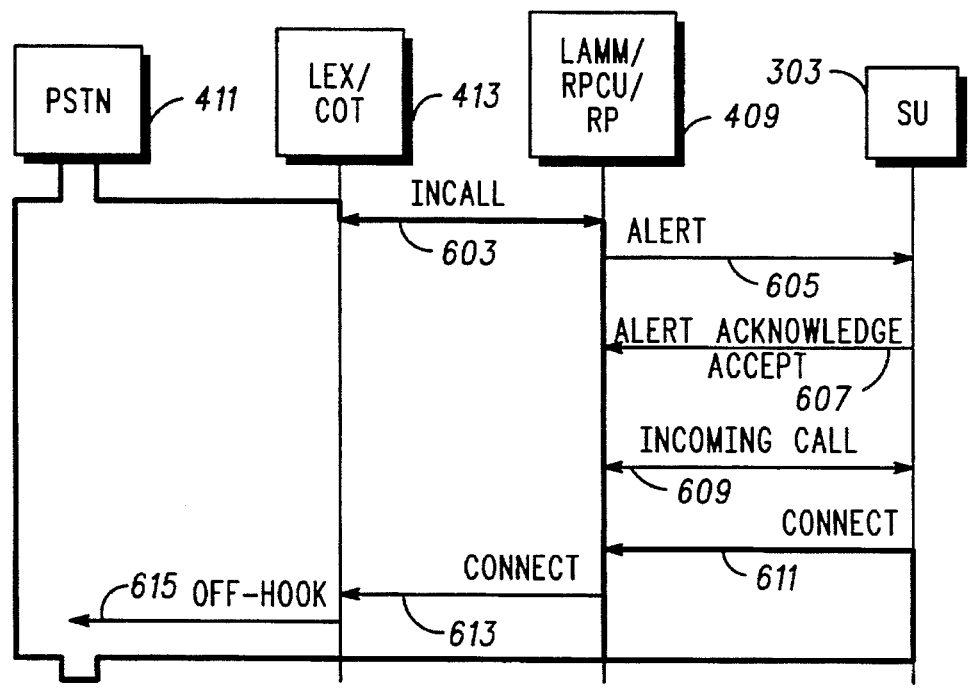
FIG. 6 is a timing diagram of an incoming call termination in the home access network which may be employed in the present invention.

FIG. 6 illustrates the process of terminating an incoming call for a subscriber unit in its home Access Network.

When the PSTN 411 delivers an incoming call to the LEX/COT 413, the LEX/COT 413 initiates an INCALL procedure 603, via the dedicated line appearance of the WLL customer, in which the LAMM/RPCU/RP 409 is informed of the incoming call and the LINE ID, and a connection is established to its RPCU. The LAMM/RPCU/RP 409 finds the customer's entry in the PSIS, determines that the subscriber unit is currently in-service and resident in the local Access Network and transmits an ALERT message 605, which initiates the alerting process using the subscriber unit's current Alert Area, Alert Phase and Alert Id. When the subscriber unit receives the alert, it uses a digital correlation process to acquire frame sync with a "marked idle" time slot and then transmits an ALERT_ACK_ACC message 607 to the LAMM/RPCU/RP 409 on the selected traffic channel. Upon receiving the ALERT_ACK—ACC message 607, the LAMM/RPCU/RP 409 sends an INCOMING_CALL message 609 to the SU 303. This message may contain a number to be used by the subscriber unit in requesting Automatic Link Transfer to another access network. This message also contains calling and called party numbers if available from the PSTN; if not, the fields will be null. When the customer answers, the subscriber unit 303 sends a CONNECT message 611 to the LAMM/RPCU/RP 409. The LAMM/RPCU/RP 409 then sends a CONNECT message 613 to the LEX/COT 413 and the LEX/COT 413 indicates OFF-HOOK 615 to the PSTN 411.

Figure 7:
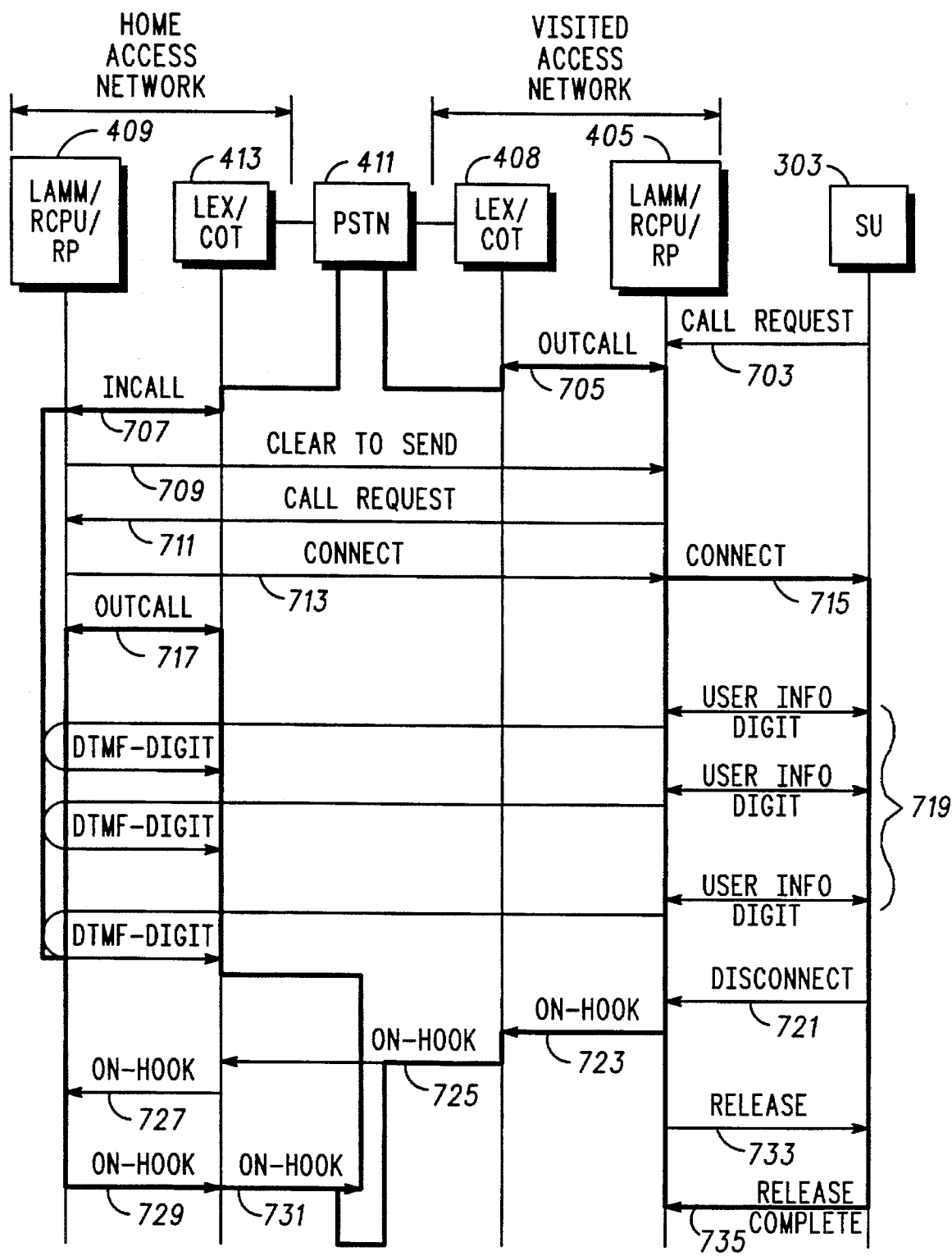
FIG. 7 is a timing diagram of subscriber call origination in the visited access network which may be employed in the present invention.

When the portable radiotelephone moves to a visited Access Network the calling process differs from that in the home local Access Network. FIG. 7 illustrates the call origination process by a subscriber unit in a visited Access Network, assuming post-access dialling. The SU 303 uses a digital correlation process to acquire frame sync with a "marked idle" time slot and then transmits a Call Request Access (CALL REQ ACC) message 703 on the selected traffic channel to the LAMM/RPCU/RP 405 in the visited Access Network; the called party number field contains no dialled digits. The LAMM/RPCU/RP 405 executes an OUTCALL transaction 705 with the local LEX/COT 408 via the access trunk group (using the HOME AREA ACCESS NUMBER stored for this SU in the TSIS) and instructs its RPCU to prepare for a data transaction with the LAMM/PCU/RP 409 in the home Access Network. The LEX/COT 408 places a call through the PSTN 411 to the LEX/COT 413 in the home Access Network. In response, the LEX/COT 413 initiates an INCALL procedure 707 via the access trunk group by which a data connection is established between the LAMM/RPCU/RP 409 and the LAMM/RPCU/RP 405. The data link is initialized and the LAMM/RPCU/RP 409 transmits a CLEAR_TO_SEND message 709 to the LAMM/RPCU/RP 405 which, in turn transmits a Call Request (CALL_REQ) message 711 to the LAMM/RPCU/RP 409 containing the Subscriber Unit Id and the Authentication Id. The LAMM/RPCU/RP 409 finds the subscriber unit's entry in the PSIS, directs its RPCU to establish a connection between the LEX/COT 413 interface channel and the access trunk group channel and sends a CONNECT message 713 to the LAMM/RPCUfRP 405. The LAMM/RPCU/RP 405 then sends the CONNECT message 715 to the SU 303. This message may contain a telephone number to be used by the portable radiotelephone in requesting Automatic Link Transfer to another access network. At this point the customer is able to hear progress tones from the PSTN 411.

The LAMM/RPCU/RP 409 executes an OUTCALL procedure 717 in which "OFF-HOOK" is indicated to the LEX/COT 413 which provides dial tone. The customer proceeds with dialling and the SU 303 detects and sends each successive digit to the LAMM/RPCU/RP 405 by means of USER INFO—DIGIT messages 719. The LAMM/RPCU/RP 405 directs its RPCU to outpulse each received digit through the PSTN 411 to the LEX/COT 413 using DTMF. When the LEX/COT 413 determines end-of-dialling, it routes the call to its destination through the PSTN 411. The origination phase is now complete from the Access Network's point of view. The PSTN completes its processing and, if the called party answers, conversation ensues.

When the customer ends the call, the SU 303 sends a DISCONNECT message 721 to the LAMM/RPCU/RP 405. The LAMM/RPCU/RP 405 then indicates ON-HOOK 723 to the LEX/COT 408 via the access trunk group and the LEX/COT 408, in turn, indicates ON-HOOK 725 to the LEX/COT 413 via the PSTN 411. The LEX/COT 413 indicates ON-HOOK 727 to the LAMM/RPCU/RP 409 via the access trunk group. The LAMM/RPCU/RP 409 returns ON-HOOK 729 to the LEX/COT 413 via the WLL customer's dedicated line appearance and the LEX/COT 413 indicates ON-HOOK 731 to the PSTN 411. The LAMM/RPCU/RP 405 sends a RELEASE message 733 to the SU 303 and the SU 303 sends a REL_COM message 735 to the LAMM/RPCU/RP 405 thereby returning the traffic channel to idle.

Figure 8:
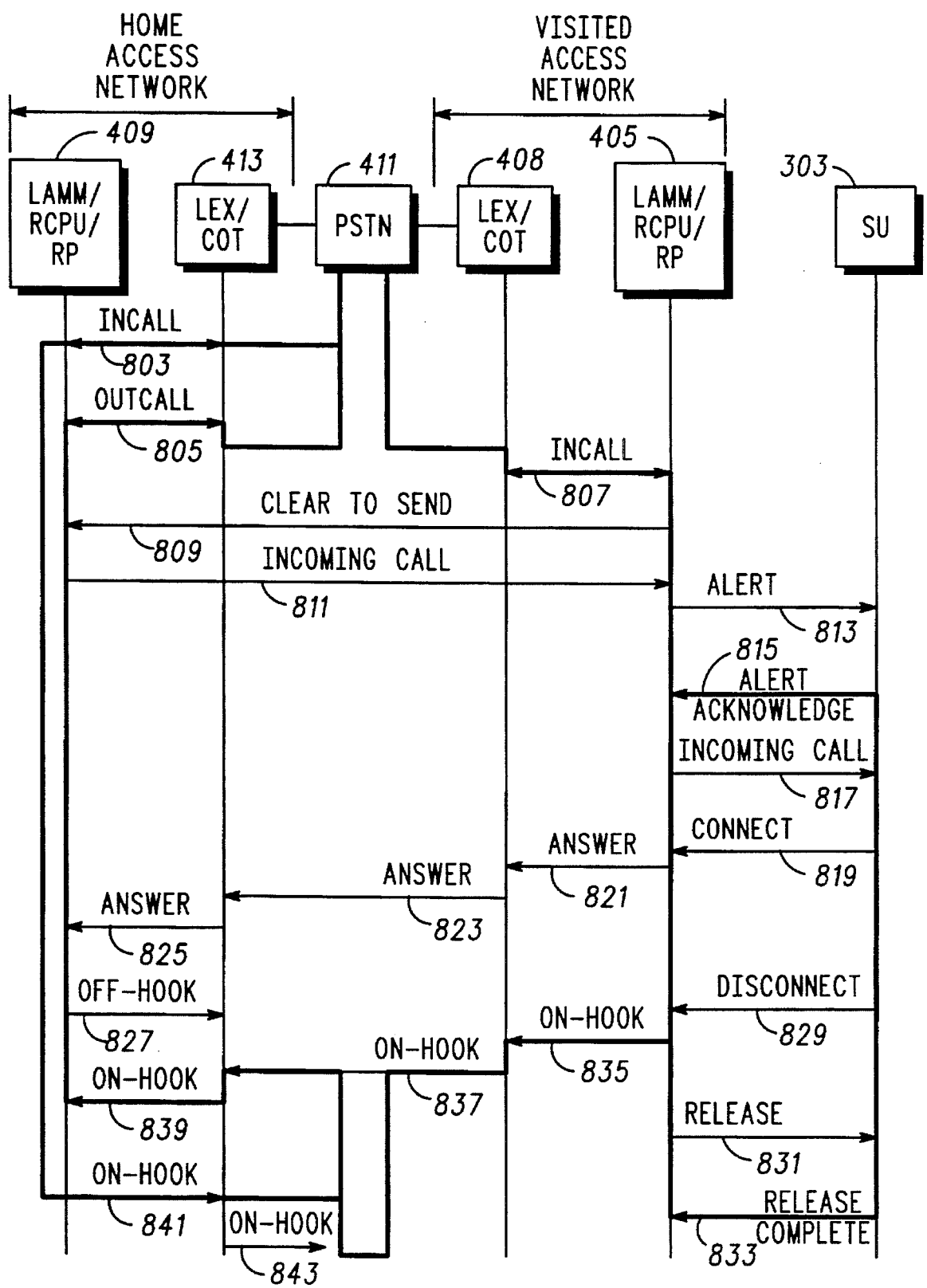
FIG. 8 is a timing diagram of an incoming call termination in the visited access network which may be employed in the present invention.

FIG. 8 illustrates the call termination process for a subscriber unit in a visited Access Network. When the LEX/COT 413 receives an incoming call from the PSTN 411, it initiates an INCALL procedure 803, via the dedicated line appearance of the WLL customer. The LAMM/RPCU/RP 409 is informed of the incoming call and the LINE ID. The LAMM/RPCU/RP 409 finds the customer's entry in the PSIS and determines that the SU 303 is currently resident in a different Access Network. It initiates an OUTCALL procedure 805 with the LEX/COT 413 via its access trunk group, using the REMOTE AREA ACCESS NUMBER supplied by the LAMM/RPCU/RP 405 with the last received Registration Notification transaction. It directs its RPCU to establish a connection for a data transaction with the LAMM/RPCU/RP 405 in the remote Access Network. After the PSTN 411 delivers the call to the LEX/COT 408, an INCALL procedure 807 is initiated via the access trunk group in which the LAMM/RPCU/RP 405 is informed of the incoming call and a connection is established for a data transaction with the LAMM/RPCU/RP 409. The data link is then initialized and the LAMM/RPCU/RP 405 transmits a CLEAR_TO_SEND message 809 to the LAMM/RPCU/RP 409. In response, the LAMM/RPCU/RP 405 transmits an INCOMING CALL message 811 to the LAMM/RPCU/RP 405 containing the Terminal Id and the Calling Party Id, if available. The LAMM/RPCU/RP 405 finds the customer's entry in the TSIS, determines that the SU 303 is currently in-service and sends an ALERT message 813 using the subscriber unit's current Alert Area, Alert Phase and Alert Id. When the SU 303 receives the alert, it uses a digital correlation process to acquire frame sync with a "marked idle" time slot and then transmits an ALERT_ACK_ACC message 815 to the LAMM/RPCU/RP 405 on the selected traffic channel. The LAMM/RPCU/RP 405 sends an INCOMING_CALL message 817 to the SU 303. This message may contain the access number to be used by the SU 303 in requesting Automatic Link Transfer to another access network. This message also contains calling and called party numbers if available from the PSTN; if not, the fields will be null. When the customer answers, the SU 303 sends a CONNECT message 819 to the LAMM/RPCU/RP 405 and the LAMM/RPCU/RP 405 indicates ANSWER 821 to the LEX/COT 408 via its access trunk group. The LEX/COT 408 sends answer supervision 823 through the PSTN to the LEX/COT 413 which, in turn, sends answer supervision to the LAMM/RPCUfRP 409 via its access trunk group. The LAMM/RPCU/RP 409 indicates OFF-HOOK 827 to the LEX/COT 413 via the customer's line appearance and directs the RPCU to connect the access trunk group channel and the subscriber's line appearance. The LEX/COT 413 provides answer supervision to the PSTN and, at this point, the call is completed and conversation ensues.

When the customer ends the call, the subscriber unit 303 sends a DISCONNECT message 829 to the LAMM/RPCU/RP 405 resulting in a RELEASE message 831 being sent to the SU 303. The SU 303 sends a REL_COM message 833 to the LAMM/RPCUfRP 405 and the traffic channel is returned to idle. Further, the LAMM/RPCU/RP 405 indicates ON-HOOK 835 to the LEX/COT 408 via its access trunk group and releases its RPCU connection. The LEX/COT 408 indicates ON-HOOK 837 through the PSTN 411 to the LEX/COT 413, which indicates ON-HOOK 839 to the LAMM/RPCU/RP 409 via its access trunk group. The LAMM/RPCU/RP 409 indicates ON-HOOK 841 to the LEX/COT 413 via the customer's line appearance and the LEX/COT 413 indicates ON-HOOK 843 to the PSTN 411.

We claim:

1. A method of providing wireless local loop operation with local mobility for a subscriber unit and in association with a public switched telephone network (PSTN) coupled to a home access network and a visitor access network, the subscriber unit having a subscriber unit identifier associated with the home access network, the method comprising the steps of:

registering the subscriber unit in the home access network and receiving a home area access number associated with a home access network trunk interconnection of the home access network with the PSTN;

registering the subscriber unit in the visitor access network when the subscriber unit leaves the home access network;

originating a telephone call from the subscriber unit in the visitor access network, including the steps of:
transmitting, int alia, said home area access number by the subscriber unit, thereby requesting service;
connecting the home access network to the visitor access network via the home access network trunked interconnection by calling through the PSTN said home area access number by the visitor access network;
conveying at least the subscriber unit identifier from the visitor access network to the home access network;
providing, from the home access network, an off-hook indication on an individual subscriber line interconnection associated with the subscriber unit to the PSTN; and
conveying telephone signals applied to the individual subscriber line interconnection by the PSTN from the home access network to the visitor access network;

wherein said step of registering the subscriber unit in the home access network further comprises the steps of:
requesting access by the subscriber unit;
confirming said access request from the home access network;
transmitting the subscriber unit identifier from the subscriber unit;
acknowledging, by the home access network, said transmission of the subscriber unit identifier with a message including said home area access number; and
storing said home area access number at the subscriber unit;

wherein the step of registering the subscriber unit in the visitor access network further comprises the steps of:
requesting access by the subscriber unit;
confirming said access request from the visitor access network;
transmitting a subscriber unit identifier and said home area access number from the subscriber unit;
determining by the visitor access network that the subscriber unit is not a local subscriber unit;
acknowledging by the visitor access network said transmission of the subscriber unit identifier;
connecting the home access network to the visitor access network via the home access network trunk interconnection by calling via the PSTN said home area access number by the visitor access network; and
conveying at least a visitor area telephone access number associated with a visitor access network trunk interconnection of the visitor access network with the PSTN to the home access network.

2. A method in accordance with the method of claim 1 wherein said step of registering the subscriber unit in the visitor access network further comprises the step of providing a visitor access number and the subscriber unit identifier to the home access network via the home area network trunk interconnection, PSTN and home area access number in response to said registration in the visitor access network.

3. A method in accordance with the method of claim 2 further comprising the step of receiving an incoming telephone call for the subscriber unit located in the visitor access network, said receiving step including the steps of:
accepting delivery of a call for the subscriber unit from the PSTN on the individual subscriber line interconnection associated with the subscriber unit;
connecting the home access network to the visitor access network via the visitor access network trunk interconnection by calling via the PSTN said visitor area access number by the home access network; and
alerting the subscriber unit in the visitor access network.

4. A method of providing wireless local loop operation with local mobility for a subscriber unit and in association with a public switched telephone network (PSTN) coupled to a home access network and a visitor access network, the subscriber unit having a subscriber unit identifier associated with the home access network, the method comprising the steps of:
registering the subscriber unit in the home access network;
registering the subscriber unit in the visitor access network when the subscriber unit leaves the home access network and providing a visitor access number and the subscriber unit identifier to the home access network in response to said registration in the visitor access network;

receiving an incoming telephone call for the subscriber unit located in the visitor access network including the steps of:
accepting delivery of a call for the subscriber unit from the PSTN on a dedicated subscriber line associated with the subscriber unit at the home access network;
establishing a connection to the visitor access network by calling via the PSTN said visitor area access number by the home access network; and
alerting the subscriber unit in the visitor access network via the connection;

wherein said step of registering the subscriber unit in the home access network further comprises the steps of:
requesting access by the subscriber unit;
confirming said access request from the home access network;
transmitting the subscriber unit identifier from the subscriber unit;
acknowledging, by the home access network, said transmission of said subscriber unit identifier with a message including said home area access number; and
storing said home area access number at the subscriber unit;

wherein said step of registering the subscriber unit in the visitor access network further comprises the steps of:
requesting access by the subscriber unit;
confirming said access request from the visitor access network;
transmitting a subscriber unit identifier and said home area access number from the subscriber unit;
determining by the visitor access network that the subscriber unit is not local subscriber unit;
acknowledging by the visitor access network said transmission of the subscriber unit identifier; and
calling via the PSTN said home area access number by the visitor access network to establish a connection to the home access network and conveying at least a visitor area telephone access number to the home access network over the connection.

5. A method in accordance with the method of claim 4 wherein said step of registering the subscriber unit in the home access network further comprises the step of receiving a home area access number

* * * * *

UNITED STATES PATENT AND TRADEMARK OFFICE
CERTIFICATE OF CORRECTION

PATENT NO. : 5,475,735
DATED : December 12, 1995
INVENTOR(S) : Williams, et al.

It is certified that error appears in the above-indentified patent and that said Letters Patent is hereby corrected as shown below:

Column 17, line 54 reads "int alia," should be —inter alia,—.
Column 20, line 24 reads "area access number" should be
—area access number.—

Signed and Sealed this

Fourteenth Day of May, 1996

Attest:

BRUCE LEHMAN

*Attesting Officer*  *Commissioner of Patents and Trademarks*